US008526667B2

(12) United States Patent
Tanaka

(10) Patent No.: US 8,526,667 B2
(45) Date of Patent: Sep. 3, 2013

(54) BROADCASTING RECEIVER WITH FUNCTION TO DETERMINE AS TO WHETHER INSTRUCTION FROM OPERATOR IS EXECUTABLE

(75) Inventor: Mayuko Tanaka, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 582 days.

(21) Appl. No.: 12/790,286

(22) Filed: May 28, 2010

(65) Prior Publication Data

US 2011/0013811 A1    Jan. 20, 2011

(30) Foreign Application Priority Data

Jul. 15, 2009    (JP) .................................. 2009-166277

(51) Int. Cl.
*G06K 9/00*    (2006.01)
(52) U.S. Cl.
USPC .......................................... 382/100; 382/104
(58) Field of Classification Search
USPC ................................................. 382/100, 104
See application file for complete search history.

(56) References Cited

U.S. PATENT DOCUMENTS

| | | | | |
|---|---|---|---|---|
| 4,694,290 A * | 9/1987 | Schwarz | .................. | 340/815.69 |
| 6,254,474 B1 * | 7/2001 | Davidsson | ...................... | 454/69 |
| 7,001,018 B1 * | 2/2006 | Martin | .......................... | 351/211 |
| 2004/0100567 A1 * | 5/2004 | Miller et al. | .................. | 348/239 |
| 2004/0103111 A1 * | 5/2004 | Miller et al. | .................. | 707/102 |

FOREIGN PATENT DOCUMENTS

| | | | |
|---|---|---|---|
| JP | 2003-111161 | | 4/2003 |
| JP | 2006197373 | * | 7/2006 |

* cited by examiner

*Primary Examiner* — Hadi Akhavannik
(74) *Attorney, Agent, or Firm* — McDermott Will & Emery LLP

(57)    ABSTRACT

In a broadcasting receiver, the receiver is so operated as not to disturb viewing by audiences other than an operator. The broadcasting receiver has an image pickup unit for photographing images of televiewers, a face detection unit for detecting faces of the televiewers from the photographed image, an individual discrimination unit for managing detected faces discriminately, a watching concentration degree calculation unit for calculating degrees of concentration of watching a television in respect of individual discriminated faces and an operation execution decision unit for deciding a television operator and deciding execution of operation in accordance with values of watching concentration degrees of the televiewers other than the operator.

17 Claims, 13 Drawing Sheets

| IDENTIFIER | STATE | POSITION | SIZE |
|---|---|---|---|
| 0 | PRESENCE | x0,y0 | w0,h0 |
| 1 | ABSENCE | | |
| 2 | NEW | x2,y2 | w2,h2 |
| 3 | TEMPORARY ID103 | x3,y3 | w3,h3 |
| : | : | : | : |
| 104 | TEMPORARY | x104,y104 | w104,h104 |
| | | | |

BROADCASTING RECEIVER WITH FUNCTION TO DETERMINE AS TO WHETHER INSTRUCTION FROM OPERATOR IS EXECUTABLE

INCORPORATION BY REFERENCE

The present application claims priority from Japanese application JP2009-166277 filed on Jul. 15, 2009, the content of which is hereby incorporated by reference into this application.

BACKGROUND OF THE INVENTION

The present invention relates to a broadcasting receiver.

In conventional broadcasting receivers such as television receivers, an operator is allowed to have the right to determine operation by leaving other audience out of consideration. To cope with this problem, JP-A-2003-111161 discloses such an expedient that when a plurality of televiewers use remote controllers dedicated to them and a remote controller granted an operation is determined in order of a predetermined priority, restriction is imposed on the number of operations of the remote controller and on the time to operate it so that the priority order may be altered.

SUMMARY OF THE INVENTION

The patent document as above features the fact that restriction is imposed on the number of operations of an own dedicated remote controller and on the time to operate it for the sake of altering the priority order.

Incidentally, in the presence of plural audiences attending to viewing, when a certain televiewer concentrates in viewing a particular program, another televiewer will happen to change the channel suddenly or the screen of the particular program will be concealed during viewing on account of a recording reservation, giving rise to a problem that the certain viewer will expectedly feel hurt and loose the opportunity of amusing the program.

In light of the above problem, the present invention has been made and it is an object of the invention to provide a broadcasting receiver capable of materializing an operation equipment which can more reduce the disturbance imposed on viewers other than an operator of the receiver in comparison with the case in the conventional receiver.

To accomplish the above object, a broadcasting receiver according to this invention comprises an image pickup unit 110 for taking a video image of postures, figures and conditions of audiences viewing programs and pictures displayed by the broadcasting receiver, a face detection unit 120 for detecting faces of televiewers from the photographed video image, an individual discrimination unit 130 for managing the detected faces discriminatively, a watching concentration degree calculation unit 140 for calculating information indicative of a degree of concentration of watching a television in respect of individual discriminated faces, and an operation execution decision unit 150 for deciding an operator of the television and determining execution of an operation in accordance with a value of the watching concentration degree information of the other audiences than the operator.

According to the present invention, operation is suspended until the watching concentration degree information of televiewers other than the operator falls below a predetermined level. As a result, improvements can be achieved in that as compared to the conventional case, the televiewers can less be disturbed and can concentrate on programs to enjoy viewing.

Other objects, features and advantages of the invention will become apparent from the following description of the embodiments of the invention taken in conjunction with the accompanying drawings.

DETAILED DESCRIPTION OF THE EMBODIMENTS

The present invention will now be described by way of example with reference to the accompanying drawings.

Embodiment 1

Figure 1:
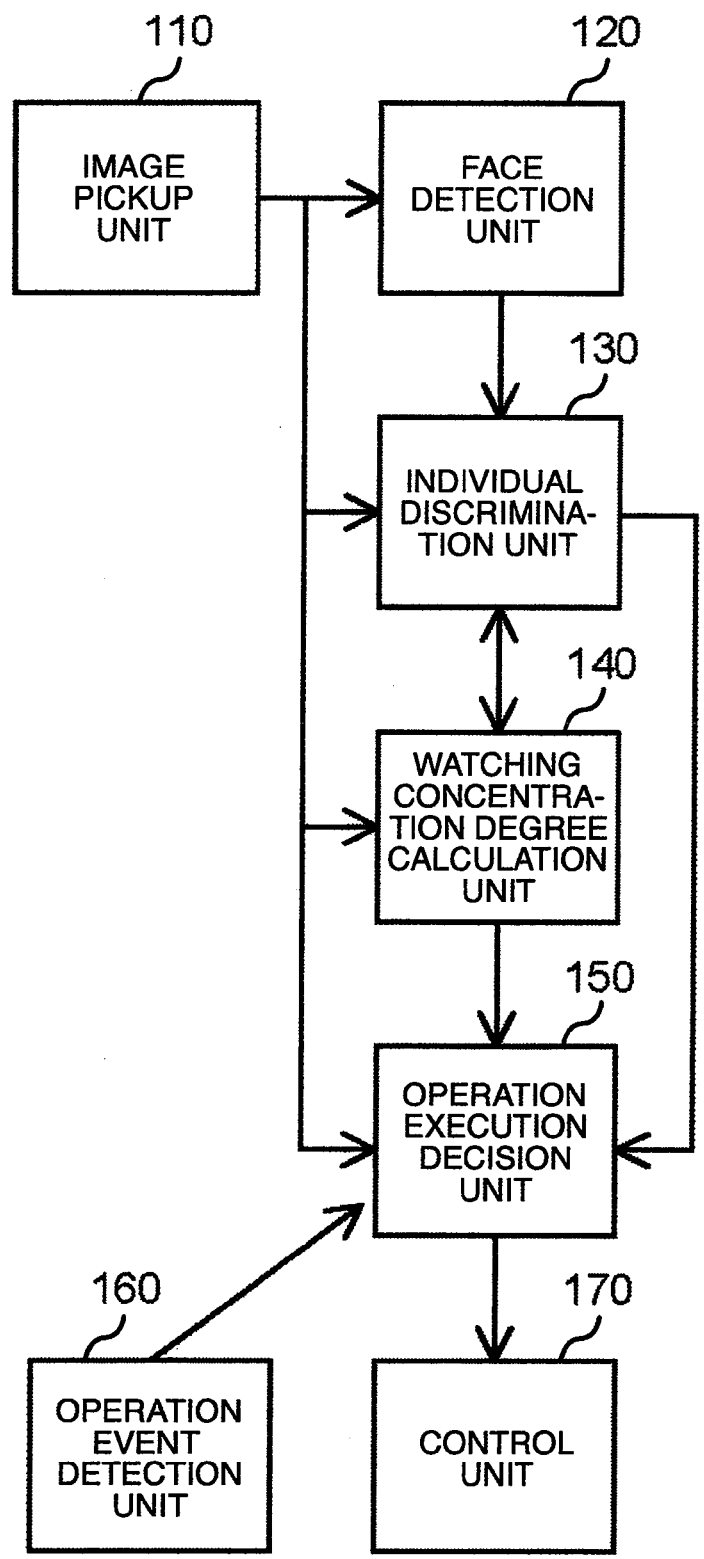
FIG. 1 is a block diagram illustrating a configuration of a broadcasting receiver according to an embodiment of the invention.

Referring first to FIG. 1, a broadcasting receiver according to embodiment 1 of the present invention (hereinafter referred to as a television) is configured as illustrated therein.

The television comprises an image pickup unit 110, a face detection unit 120, an individual discrimination unit 130, a watching concentration degree calculation unit 140, an operation execution decision unit 150, an operation event detection unit 160 and a control unit 170. Hereinafter, the watching concentration degree information will simply be called a watching concentration degree.

The image pickup unit 110 is a unit for taking a video image of audiences viewing the television. The video image taken by the image pickup unit 110 is inputted to the face detection unit 120, individual discrimination unit 130, watching concentration degree calculation unit 140 and operation execution decision unit 150. The face detection unit 120 acquires information indicative of a face region image inclusive of a face from the video image taken by the image pickup unit 110 and after acquisition of the face region image information, detects the face region to generate face detection information adapted for face detection and delivers the result of face detection to the individual discrimination unit 130. A method for detection of faces is not particularly delimited.

The existing technique may be employed which is exemplarily typified by a detection method using face model template information indicative of information which makes face detection possible in correspondence with the face detection information adapted for face detection. As the result of face detection, coordinates of the face region and the size thereof are outputted in respect of individual detected faces. To add, the template information will simply be called template hereinafter.

By using the detected face detection result, the individual discrimination unit 130 cuts out an image of the face region from the video image taken by the image pickup unit 110, compares the cutout image with an personal template to discriminate an individual, allots an identifier and adds identifier information for distinguishing the individual person to the face detection result generated by the face detection unit 120.

Figure 6:
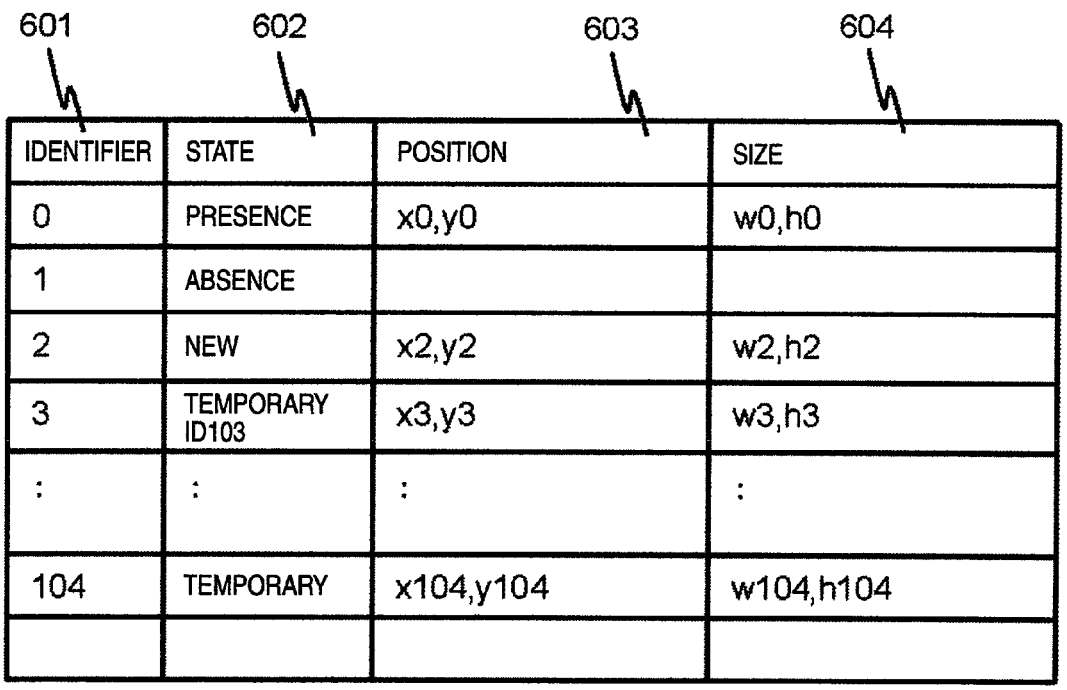
FIG. 6 is a table showing the results of face detection stored in the individual discrimination unit.

Hereinafter, information having the face detection result added with the identifier information for distinguishing the individual person will be termed an identifier added face detection result 600 (FIG. 6). A method for individual discrimination and a method of preparing an personal template used for individual discrimination are not particularly delimited. The existing technique represented by, for example, a method of detecting organs such as eyes, mouth and nose and comparing feature points may be adopted. The watching concentration degree calculation unit 140 cuts out an image of the face region from the video image taken by the image pickup unit 110 by using the identifier added face detection result 600 (FIG. 6) generated by the individual discrimination unit 130 and calculates watching concentration degrees in respect of the individual persons.

Processes of face detection, individual discrimination and watching concentration degree calculation may be executed either in a unit of time for the image pickup unit 110 to take pictures (every frame) or in a unit of process time defined by a predetermined time interval.

Responsive to an operation event inputted from the operation event detection unit 160, the operation execution decision unit 150 decides an operator and the other televiewers from a video signal of the picture photographed by the image pickup unit 110 and the identifier added face detection result acquired from the individual discrimination unit 130, determines execution of operation in accordance with watching concentration degrees of the other televiewers and outputs the decision result to the control unit 170.

The operation event detection unit 160 detects an operation event stemming from a remote controller or an operation panel which are not described herein and when detecting such an operation event as channel switchover or recording reservation which disturbs watching, informs it to the operation execution decision unit 150.

The control unit 170 is a unit for controlling the whole of the television not shown herein. Particularly, however, following the result of decision by the operation execution decision unit 150, the control unit 170 controls execution of operation stemming from the remote controller and the operation panel.

Details of process by the individual discrimination unit 130, watching concentration degree calculation unit 140 and operation execution decision unit 150 will be described in sequence.

The individual discrimination unit 130 performs discrimination by using the face detection result information detected by the face detection unit 120 and allotting identifiers to the photographed televiewers, respectively.

A description will now be given by making reference to FIGS. 2, 5, 6 and 7.

Figure 2:
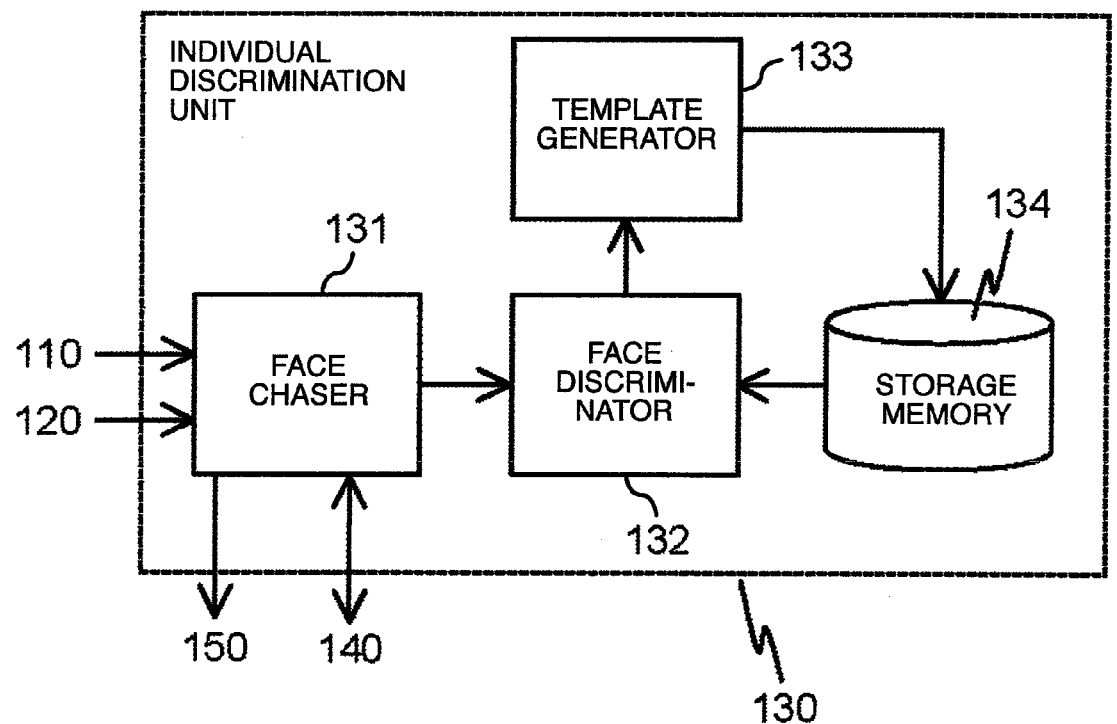
FIG. 2 is a block diagram showing the construction of an individual discrimination unit.
Figure 5:
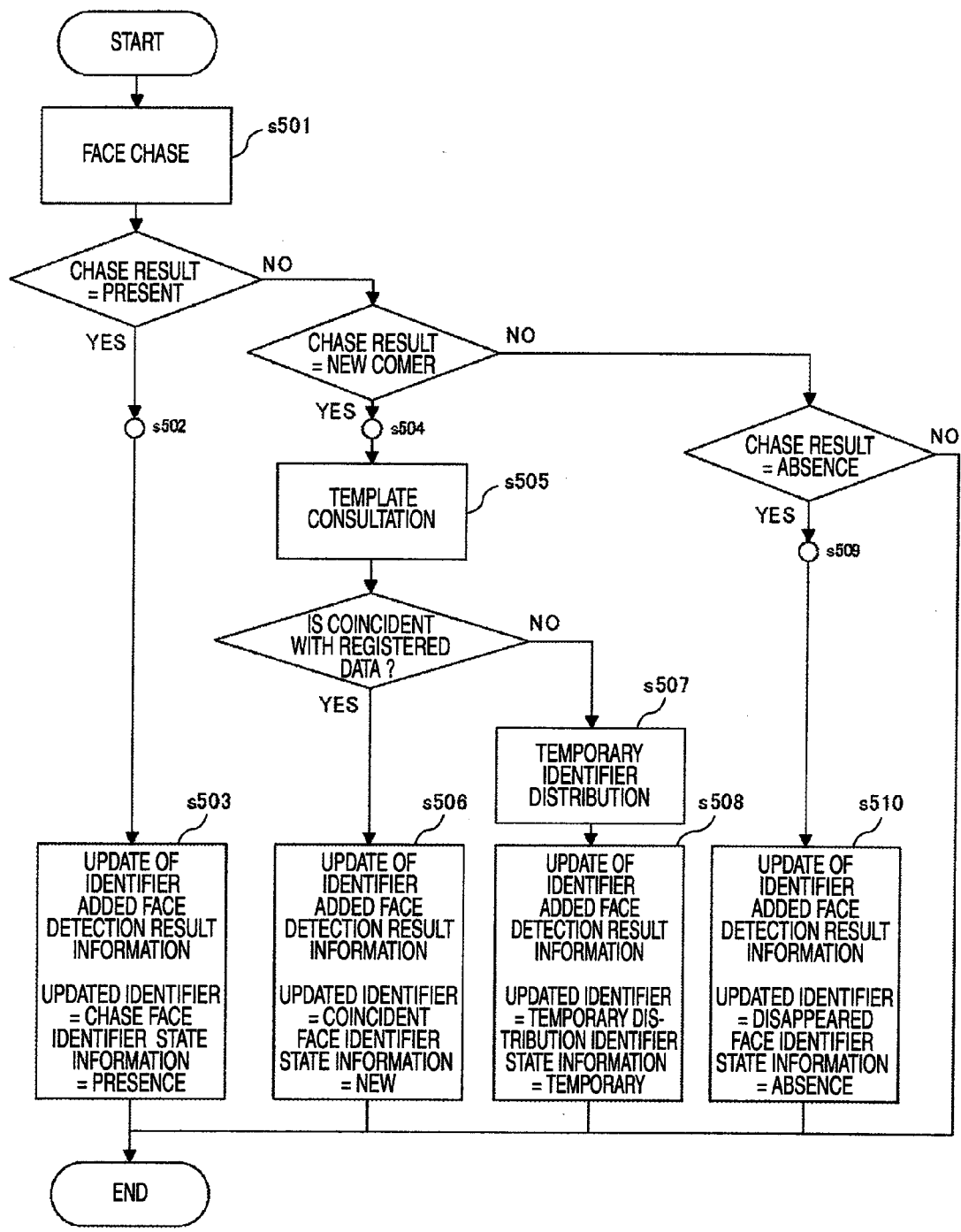
FIG. 5 is a flowchart of an individual discrimination process.
Figure 7:
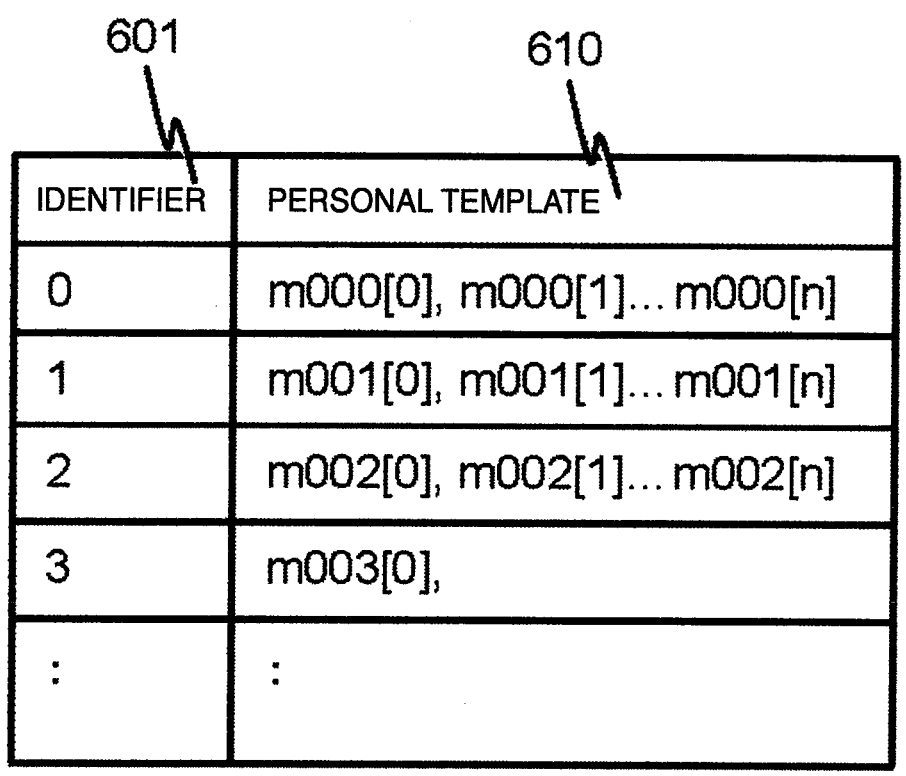
FIG. 7 is a table showing face templates stored in the individual discrimination unit.

FIG. 2 illustrates the individual discrimination unit 130 in block diagram form, FIG. 5 shows a flowchart of an individual discrimination process, FIG. 6 shows, in table form, an identifier added face detection result 600 memorized by the individual discrimination unit and FIG. 7 shows, in table form, personal templates memorized by the individual discrimination unit.

As shown in FIG. 2, the individual discrimination unit 130 includes a face chaser 131, a face discriminator 132, a template generator 133 and a storage memory 134.

The face chaser 131 makes a decision as to which identifier added face in an identifier added face detection result 600 that has been stored in the storage memory 134 during the preceding frame (process time unit) the face, included in the result of face detection by the face detection unit 120, corresponds to. Used as the method for pursuit of face may be the existing technique as represented by, for example, a representative point matching method using a brightness signal or a method of detecting a motion vector and performing the pursuit on the basis of the detected motion vector.

Pursuant to the face chase result by the face chaser 131, the following three states are decided:

(1) "Presence": A face which can make correspondence with the identifier added face detection result 600 exists.
(2) "New": A face which can make correspondence with the face detection result by the face detection unit 120 does not exist in the face identifier added face detection result 600.
(3) "Absent": An identifier added face detection result 600 which cannot make correspondence with the face detection result by the face detection unit 120 prevails.

The face discrimination unit 132 compares video image data of a face region detected by the face detection unit 120 with personal templates and decides whether a known televiewer for which a personal template is stored is present or a new televiewer is present. In the presence of the known televiewer, the identifier added face detection result 600 is updated for the identifier concerned. In the presence of the new televiewer, a temporary identifier is allotted and added to the identifier added face detection result 600.

The template generator 133 is adapted to generate a personal template by using video image data of a face region detected by the face detection unit 120. As shown in FIG. 7, identifiers and personal templates are memorized such that the correspondence can be made between the identifier and the personal template. For one identifier, a plurality of personal templates can be stored.

The storage memory 134 stores the identifier added face detection result 600 and the personal template. Physically, it does not matter that a different or separate storage memory is used in common to the memory 134.

An individual discrimination process will now be described using a flowchart of individual discrimination process shown in FIG. 5.

In step s501, a face chase process is carried out. In accordance with the face chase result, the program branches to different steps.

If the face chase result indicates "presence", it is determined that a televiewer now viewing keeps viewing continuously and the program proceeds to node s 502.

If the face chase result indicates "new", determining that a new televiewer comes up, the program proceeds to node s504.

If the face chase result indicates "absence", determining that a televiewer leaves the television, the program proceeds to node s509.

Node s502 continues to step s503 where an identifier added face detection result information update process is carried out when the televiewer is present continuously.

In step s503, information of identifier added face detection result 600 concerned with an identifier (601) for which "presence" is determined in step s501 is updated.

In the update process, for information of "State" (602), "Presence" stands and for information of "Face detection result" (603), replacement with information detected by the face detection unit 120 is effected.

Because the new televiewer comes up, node s504 continues to steps s505 and ensuing steps in which a face discrimination process is carried out.

In step s505, a personal template registered in the storage memory 134 is consulted to make a decision as to whether the personal template corresponds to a memorized known televiewer or a new televiewer. In the case of coincidence with registered data, an identifier is consulted by the coincident personal template and is acquired, followed by proceeding to step s506. In the case of non-coincidence, the program proceeds to step s507.

In step s506, information of identifier added face detection result 600 inclusive of the identifier (601) determined as corresponding to the known televiewer in step s505 is updated.

In the update process, for information of "State" (602), "New" stands and for information of "Face detection result" (603), replacement with information detected by the face detection unit 120 is effected.

In step s507, a temporary identifier is allotted to the new televiewer.

In step s508, the information of new televiewer allotted with the temporary identifier is added to the information of identifier added face detection result 600.

In the addition process, for information "State"(602), "New" stands and for information of "Face detection result" (603), information detected by the face detection unit 120 is used.

Node s509 continues to step s510 where an identifier added face detection result information update process when the televiewer is "Absent" is carried out.

In step s510, information of identifier added face detection result for the identifier (601) determined as being "Absent" in step s501 is updated.

In the update process, for information "State" (602), "Absent" stands and information of "Face detection result" (603) is erased.

The watching concentration degree calculation unit 140 cuts out a video image of a face region from a picture image taken by the image pickup unit 110 with the help of an identifier added face detection result 600 generated by the individual discrimination unit 130 and calculates watching concentration degrees in respect of individual persons.

A description will now be given by making reference to FIGS. 3, 8 and 10.

Figure 3:
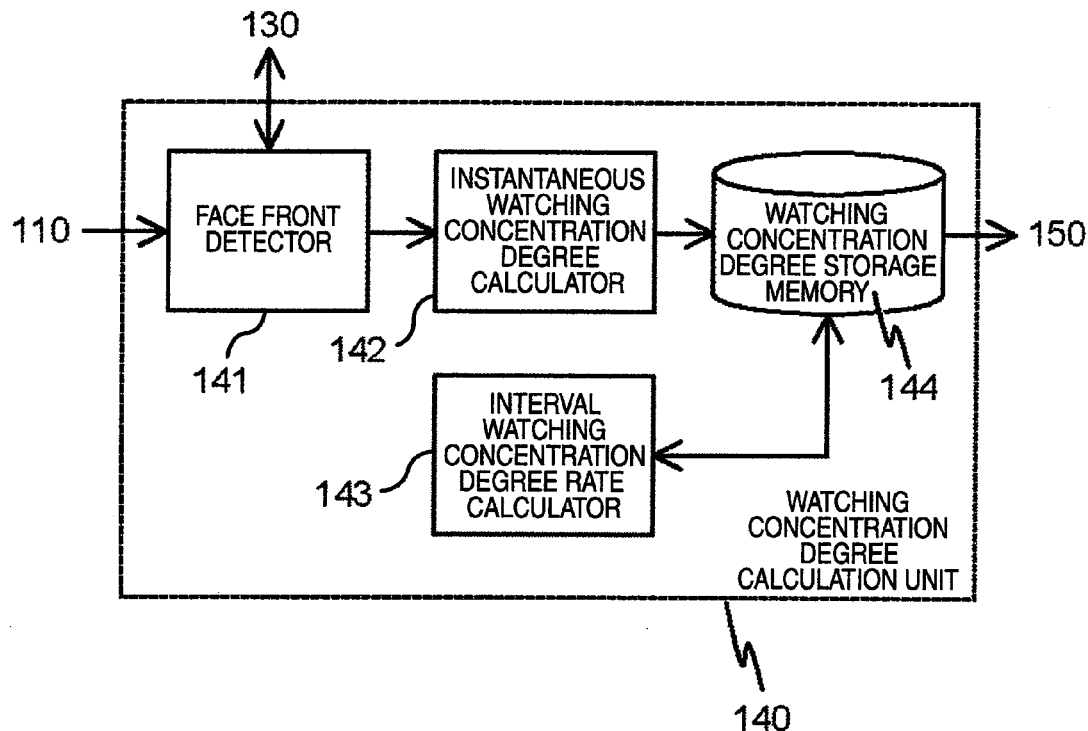
FIG. 3 is a block diagram showing the construction of a watching concentration degree calculation unit.
Figure 8:
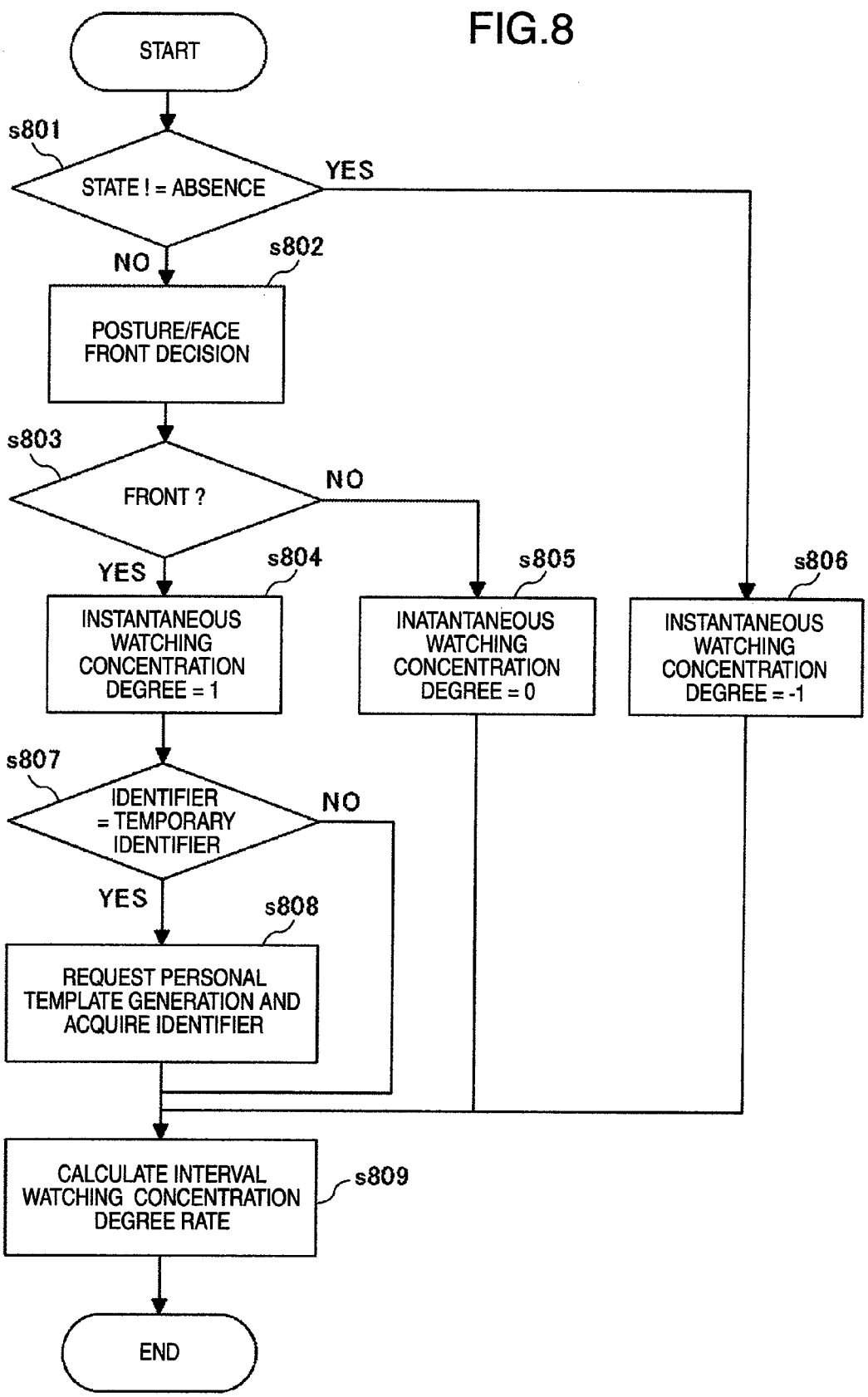
FIG. 8 is a flowchart of a watching concentration degree calculation process.
Figure 10:
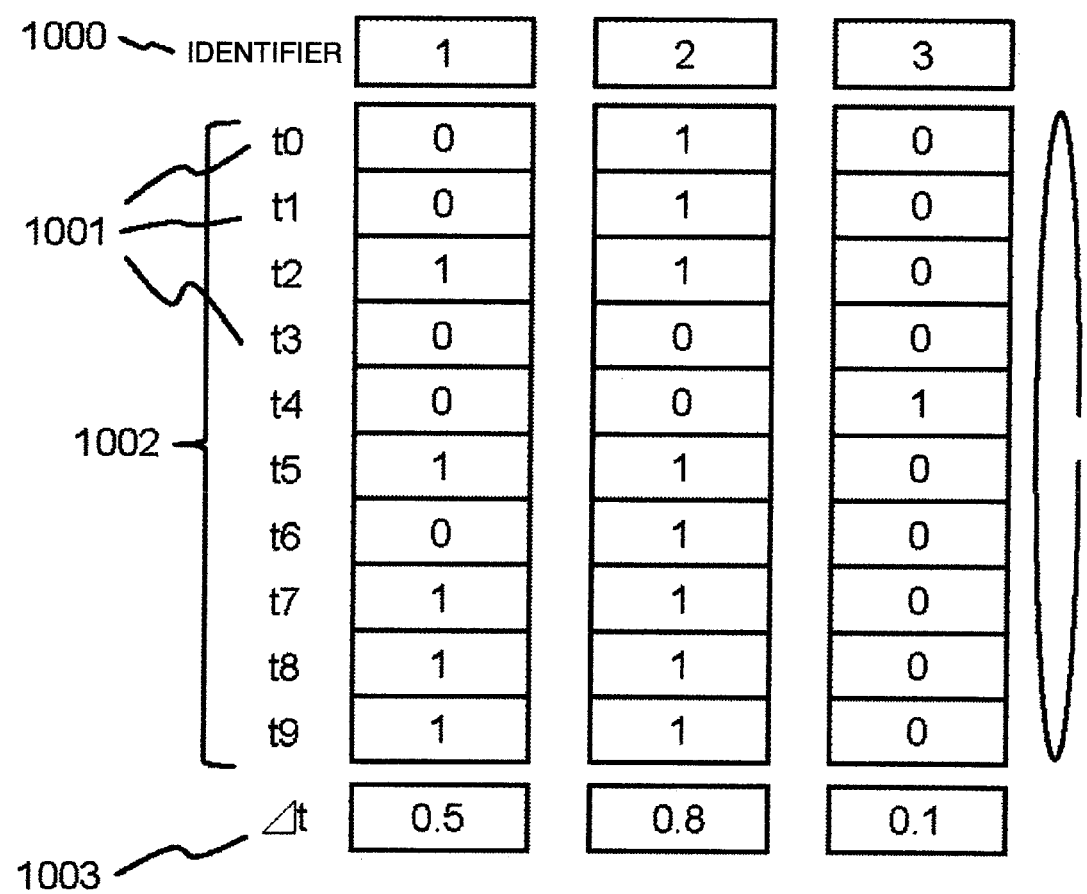
FIG. 10 is a diagram showing watching concentration degree information the watching concentration degree calculation unit stores in respect of individual persons.

FIG. 3 illustrates the watching concentration degree calculation unit 140 in block diagram form, FIG. 8 shows a flowchart of a watching concentration degree calculation process and FIG. 10 diagrammatically shows watching concentration degree information in respect of individual persons.

As shown in FIG. 3, the watching concentration degree calculation unit 140 includes a facial front detector 141, an instantaneous watching concentration degree calculator 142, an interval watching concentration degree calculator 143 and a watching concentration degree storage memory 144.

The facial front detector 141 calculates a facial front as defined by the magnitude of rotation, upward/downward inclination and rightward/leftward inclination and on the basis of facial front information, makes a frontal decision as to whether the face directs frontally to the television or not. For calculation of the rotation magnitude, upward/downward inclination and rightward/leftward inclination, the existing technique exemplified by a method of fitting a three-dimensional face model to a face image may be used.

In a method of making a frontal decision, for example, a face image containing all organs characteristic of a face (both eyes, nose and mouth) is adopted and when conditions that the absolute value of magnitude of rotation is 95 degrees or less, the absolute value of upward/downward inclination is 5 degrees or less and the rightward/leftward inclination is 5 degrees or less are satisfied, the facial front is determined. The range of rotation magnitude is set broadly because a posture of viewing with his/her chin cupped in his/her hand and a posture of lying on his/her side during viewing need to be detected.

The above method is not always necessary and a method capable of making a decision as to whether the face of a televiewer directs frontally to the television may suffice.

The instantaneous watching concentration degree calculator 142 calculates instantaneous watching concentration degrees of individual persons at intervals of predetermined time and constantly records, in the watching concentration degree storage memory 144, the latest instantaneous watching concentration degrees for a predetermined time period (hereinafter called interval).

On the basis of the instantaneous watching concentration degrees for the interval calculated by the instantaneous watching concentration degree calculator 142, the interval watching concentration degree rate calculator 143 calculates the latest interval watching concentration degree rate and records it in the watching concentration degree storage memory 144.

As shown in FIG. 10, the watching concentration degree storage memory 144 records instantaneous watching concentration degrees 1001 of an interval and an interval watching concentration degree 1003 as well. Reference to both of the instantaneous watching concentration degrees and the interval watching concentration degree rate can be made by the use of identifiers allotted by means of the individual discrimination unit 140. The instantaneous watching concentration degrees 1001 are recorded in a memory region of ring buffer structure and the latest instantaneous watching concentration degrees by the number contained in the interval (that is, the interval watching concentration degree string) are constantly stored. In the figure, t0, t1, . . . represent snap shots for calculating instantaneous watching concentration degrees at the same time instant in respect of all of the televiewers.

By using FIG. 8 showing a flow chart of watching concentration degree calculation, a watching concentration degree calculation process will be described.

In step s801, a state for which the watching concentration degree is calculated from an identifier added face detection result 600 generated by the individual discrimination unit 130 is decided by consulting an identifier. If the state is not "absent", the program proceeds to step s802 where a face front decision process is executed. If the state is "absent", the instantaneous watching concentration degree is set to "−1" (step s806). Then, the program proceeds to step s809 where the interval watching concentration degree rate calculation process is executed.

In step s802, the face front is decided by using a video image of a face region from a video image taken by the image pickup unit 110. By using the existing method of fitting a three-dimensional face model to a face image, it is decided whether the face directs frontally to the television (s802). When the face directs frontally, the instantaneous watching concentration degree is determined in step s804 and in the other case, it is determined in step s805.

In step s804, when the face directs frontally to the television, a watching concentration state is determined and the instantaneous watching concentration degree is set to "1". Subsequently, the program proceeds to step s807.

In step s805, when the face does not direct frontally to the television, a state of unconcerned watching is determined and the instantaneous watching concentration degree is set to "0". Then, the program proceeds to step s809.

In step s807, it is decided whether an identifier of the face determined to direct frontally is a temporary identifier. With the temporary identifier determined, the program proceeds to step s808 but when the temporary identifier is not determined, the program proceeds to a process in step s809.

The face having a temporary identifier as its identifier either represents an unregistered face for which a personal template is not stored or indicates that part of the face is concealed, for example, to degrade the photographing condition of a face image and as a result, an individual person cannot be discriminated. Accordingly, in step s808, when the face is so determined as to direct frontally, the individual discrimination unit 130 is requested to prepare a personal template so that a face identifier allotted to the face may be acquired. Then, the value of the temporary identifier recorded in the watching concentration degree storage memory 144 is replaced with the allotted identifier. In this manner, even when the individual discrimination state changes from the temporary state discriminated by the temporary identifier to the genuine state for distinguishing a known individual person having a personal template registered, the latest interval watching concentration degree rate information can be held continuously without interruption. A description of the personal template generation process will be given later.

In step s809, an interval watching concentration degree 1003 is calculated from the interval instantaneous watching concentration degree string information recorded in the watching concentration degree storage memory 144. In the calculation method, the rate of the instantaneous watching concentration degrees having watching concentration state "1" is determined within the interval time. But, this method is not limitative and the rate of conditions in each of which an instantaneous concentration degree state "1" comes up sequentially twice or more can be set as an interval watching concentration degree 1003. The interval watching concentration degree rate is updated synchronously with a predetermined time interval for calculation of the instantaneous watching concentration degrees and the latest interval watching concentration degree 1003 of the interval watching concentration degree 1003 is stored constantly in the watching concentration degree storage memory 144.

Figure 9:
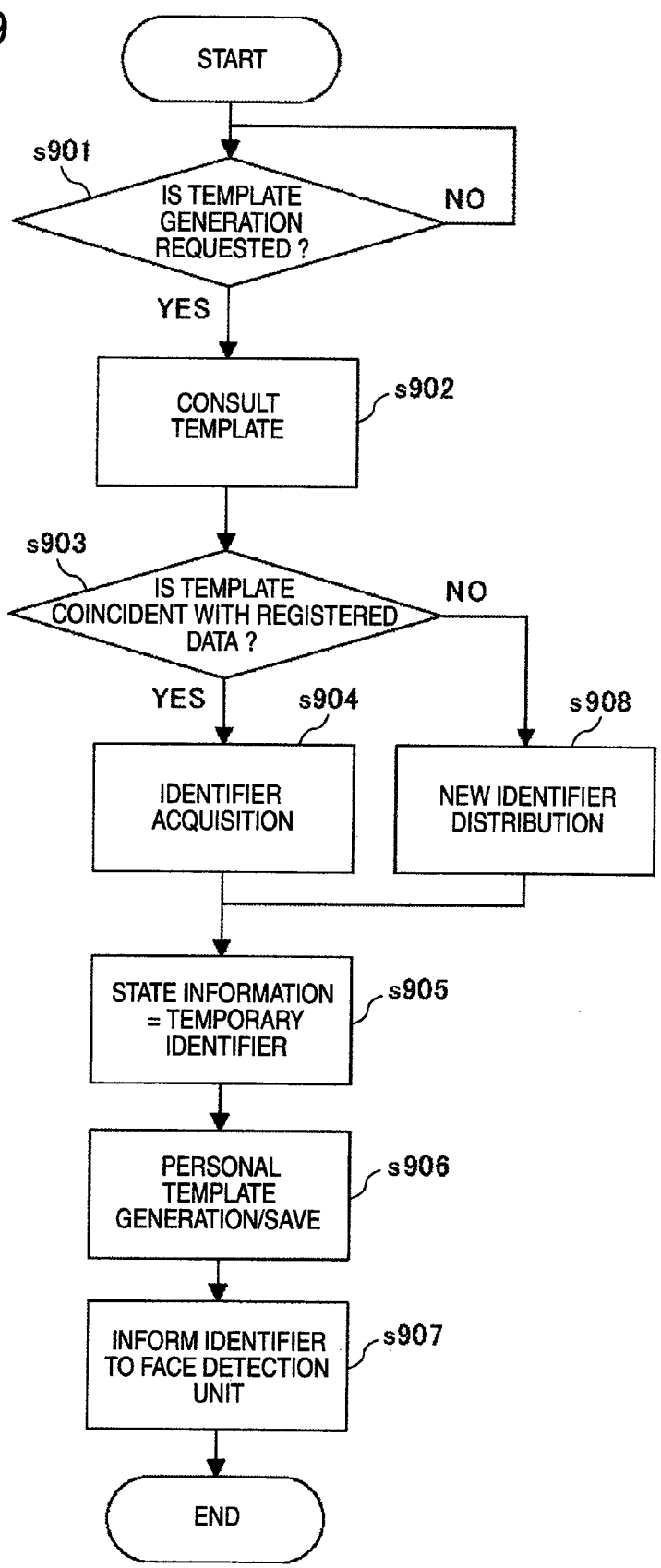
FIG. 9 is a flowchart of a template generation process.

By using a flowchart of personal template generation process in FIG. 9, the personal template generation procedure in the individual discrimination unit 140 will now be described.

In step s901, a request for personal template generation is awaited and when the request is made, the program proceeds to step s902.

In step s902, by consulting a face image requested for personal template generation and an individual personal template registered in the storage memory 134, it is decided whether the individual personal template is for a memorized known televiewer or for a new televiewer. When the personal template coincides with the registered data, the program proceeds to step s904 but when non-coincidence occurs, the program proceeds to step s908.

In step s904, by consulting the storage memory 144, an identifier of the personal template determined as coincident in step s902 is acquired and the program proceeds to step s905.

In step s905, the state information in the identifier added face detection result 600 is updated to a value of the temporary identifier, demonstrating that the state changes from the temporary identifier to the genuine identifier. Also, the identifier information is updated to the value of genuine identifier. Then, the program proceeds to step s906. [0065] In step s908, because of non-coincidence with the registered data, a new identifier is allotted. Thereafter, the program proceeds to step s905.

In step s906, a personal template is generated from a face image for which personal template generation is requested and is stored in the storage memory 134 as template 610 for deciding the individual of the identifier distributed in step s904 or s908. When the number of personal templates registered in the concerned identifiers exceeds a memorable number, the oldest information is erased. Then, the program proceeds to step s907.

In step s907, the identifier allotted to the face image is returned to the personal template generation request originator and the process ends.

In this manner, for a face image for which the personal template is unregistered, a personal template is generated in case the face image directs frontally and suitably for discrimination template. This ensures that a highly accurate personal template can be generated. Further, a decision is made as to whether the template is unregistered or not and the personal template can be generated and registered without resort to the user's labor.

Responsive to an operation event inputted from the operation event detection unit 160, the operation execution decision unit 150 decides execution of operation in accordance with watching concentration degrees of televiewers.

A description will now be given by making reference to FIGS. 4, 11, 12, 13 and 14.

Figure 4:
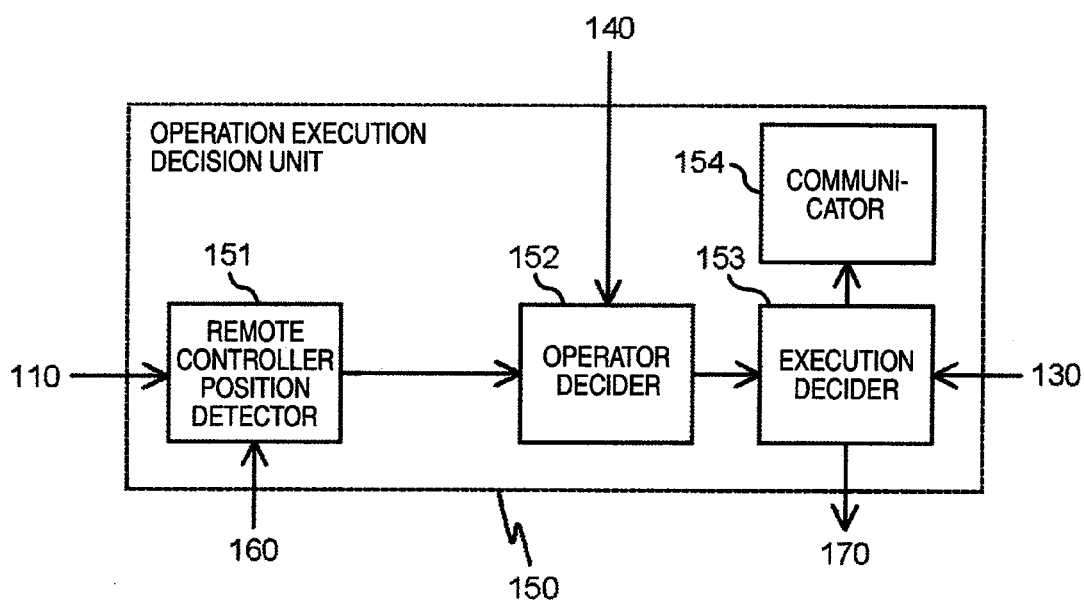
FIG. 4 is a block diagram showing the construction of an operation execution decision unit.
Figure 11:
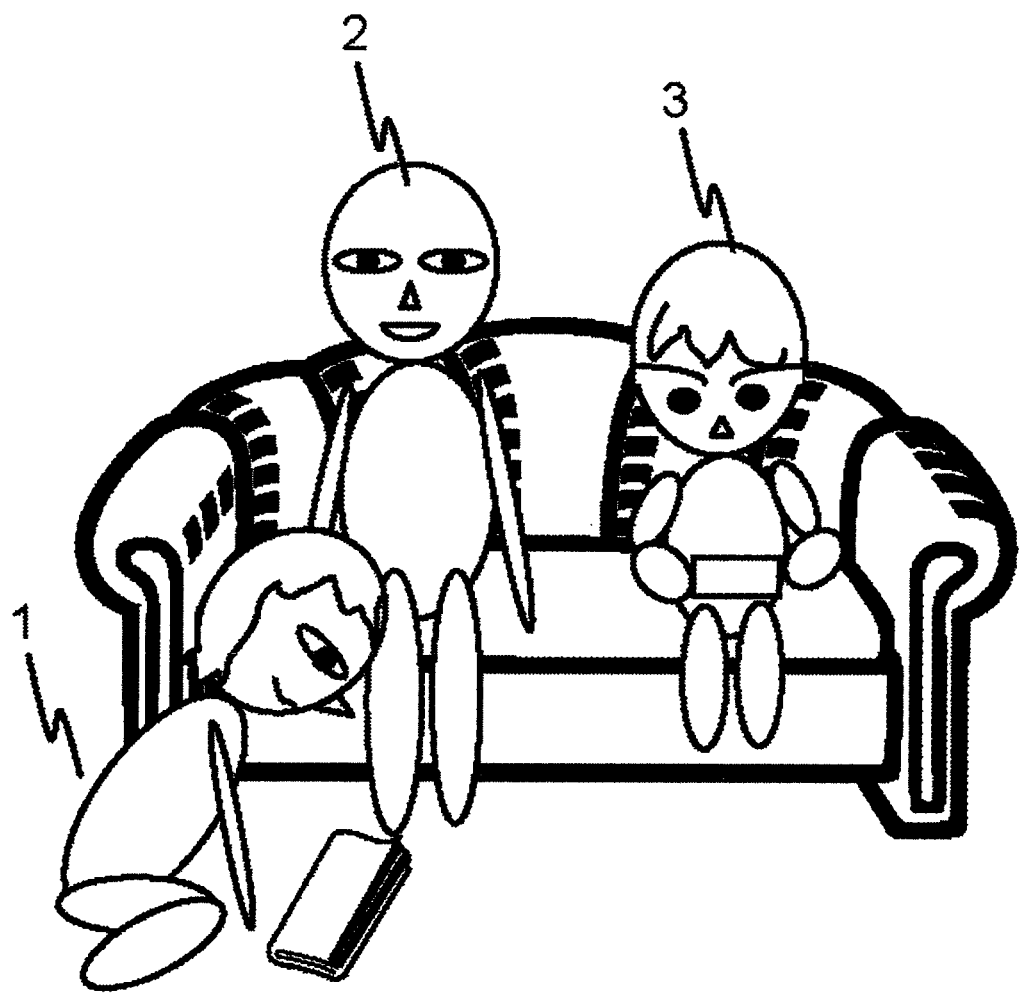
FIG. 11 is a pictorial diagram illustrating televiewers.
Figure 12:
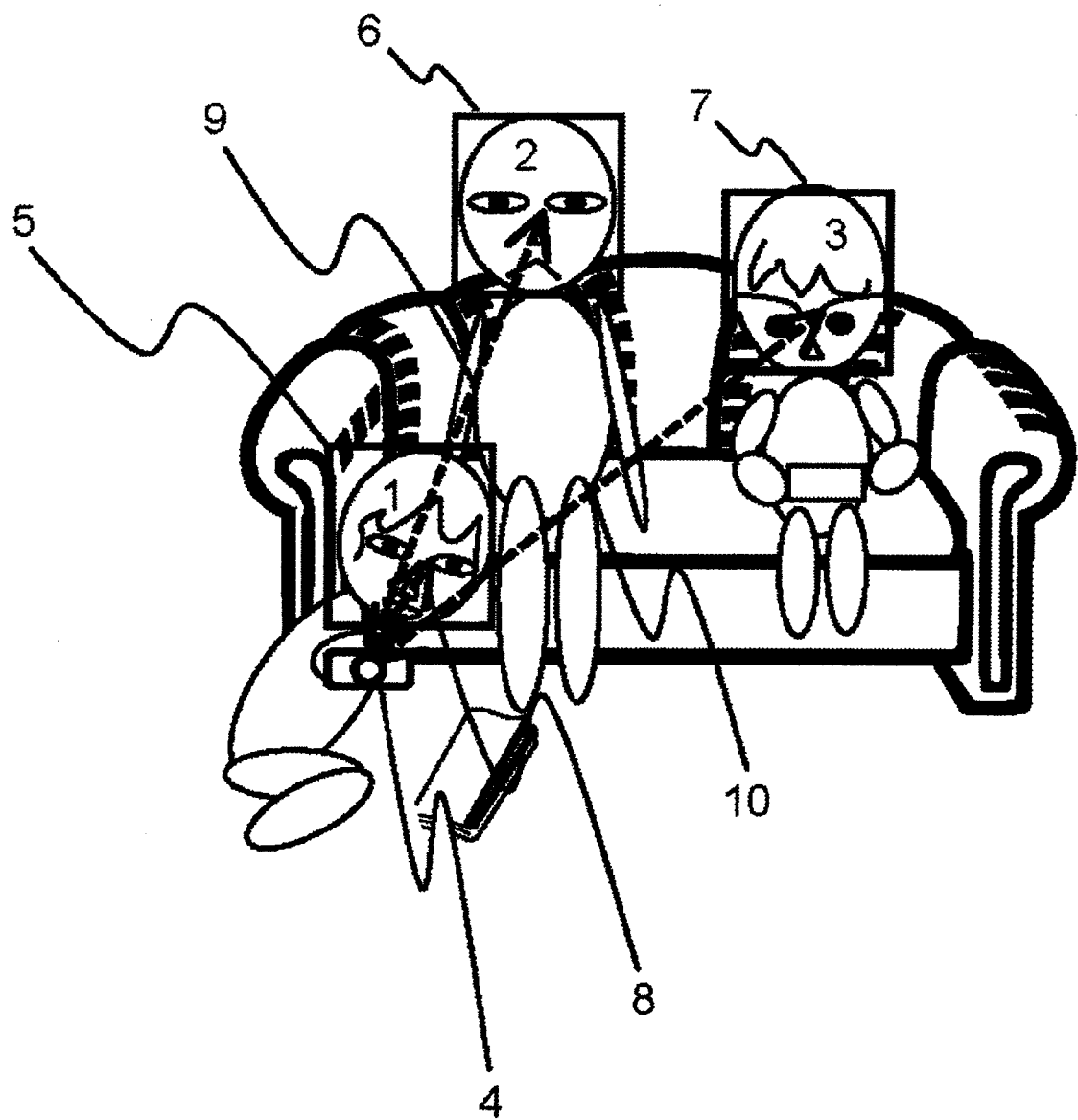
FIG. 12 is a pictorial diagram illustrative of an example of a television operator decision method.
Figure 13:
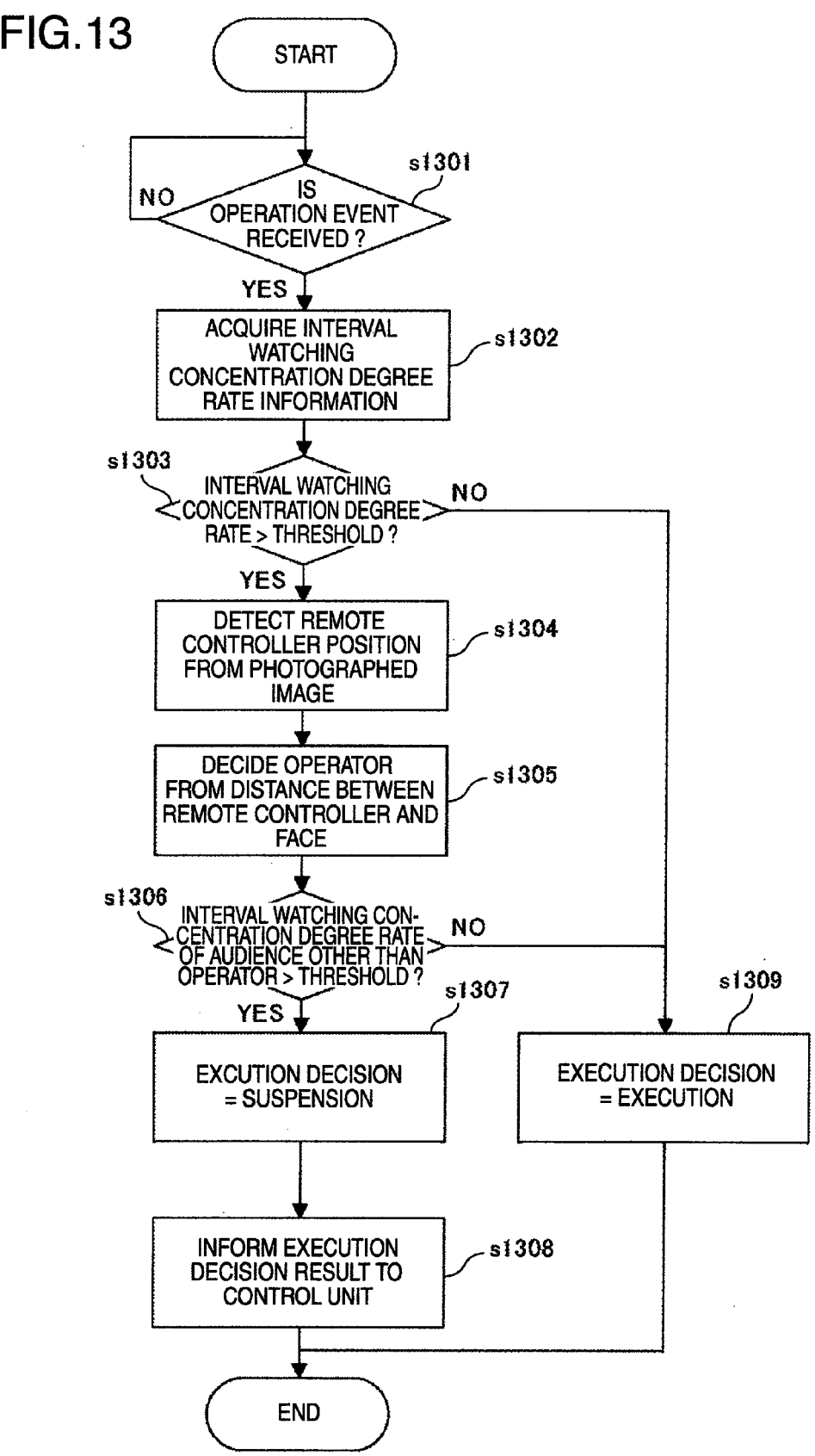
FIG. 13 is a flowchart of an operation execution decision process.
Figure 14:
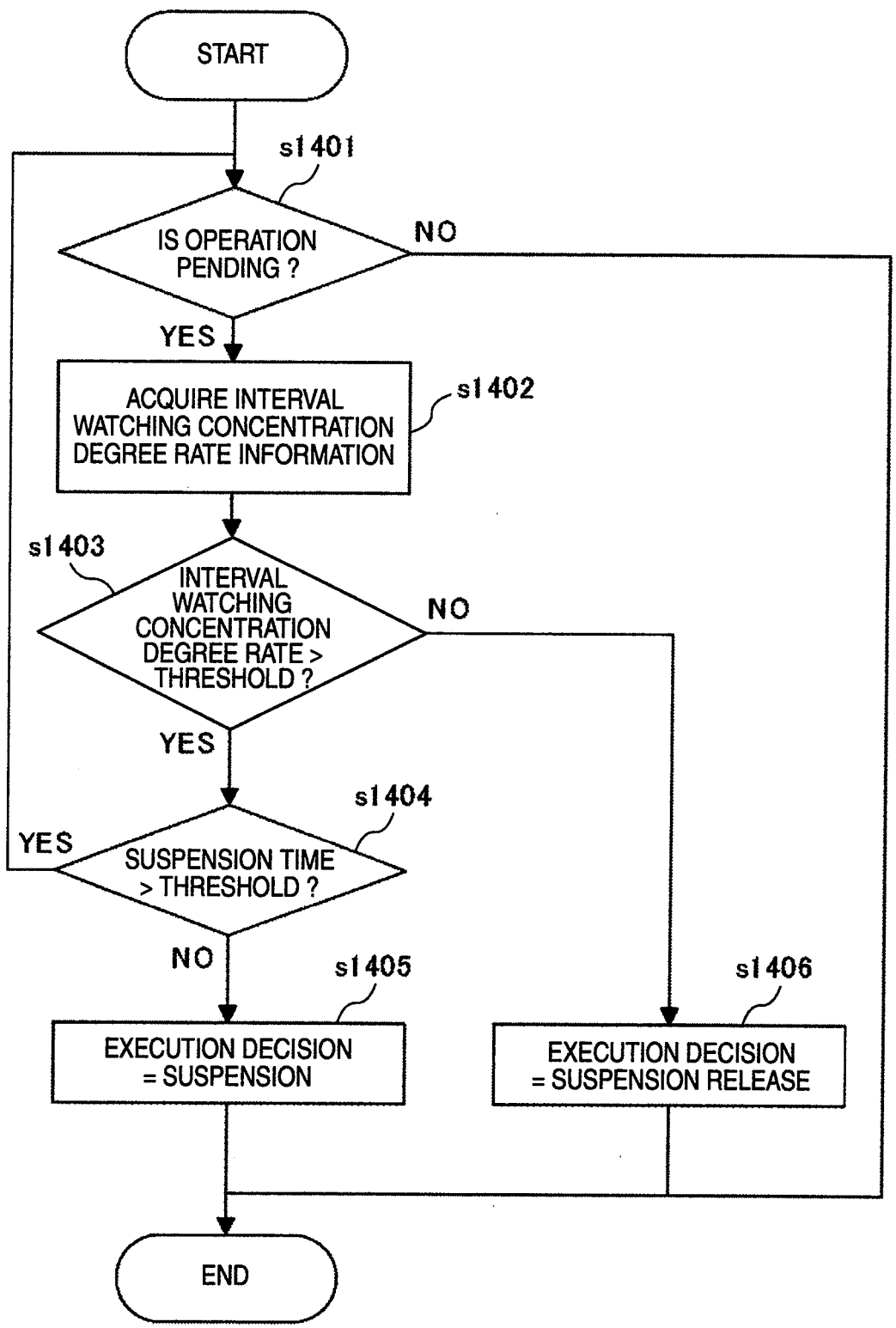
FIG. 14 is a flowchart of a process during operation suspension.

FIG. 4 illustrates the operation execution decision unit 150 in block diagram form, FIG. 11 is a pictorial diagram illustrating television viewers, FIG. 12 is a pictorial diagram illustrating an example of a method for deciding a television operator, FIG. 13 shows a flowchart in operation execution decision and FIG. 14 shows a flowchart of a process when operation is suspended.

As shown in FIG. 4, the operation execution decision unit 150 includes a remote controller position detector 151, an operator decider 152, an execution decider 153 and a communicator 154.

Responsive to an operation event inputted from the operation event detection unit 160, the remote controller position detector 151 detects a position of the remote controller from a video image taken by the image pickup unit 110. The remote controller position is detected from the screen by detecting infrared rays transmitted from the remote controller.

By using remote controller position information detected by the remote controller position detector 151 and the identifier added face detection result 600 generated by the individual discrimination unit 130, the operator decider 152 decides an operator. For example, televiewers are present and they are allotted with identifiers 1, 2 and 3, respectively, as shown in FIG. 11. For decision of the operator, distances 8, 9 and 10 from the remote controller to the faces are calculated on the basis of the remote controller position 4 and pieces of face position information 5, 6 and 7 contained in the face detection results as shown in FIG. 12 and the shortest distance is determined as corresponding to the operator's face. In the case of FIG. 12, the identifier 1 is determined as corresponding to the operator.

The execution decider 153 is adapted to decide execution of a requested operation by using the interval watching concentration degree rate calculated by the watching concentration degree calculation unit 140. When an interval watching concentration degree rate for the televiewers other than the operator determined by the operator decider 152 is larger than a preset threshold, the operation is determined as invalidated or suspended.

The communicator 154 is adapted to inform the operator that the operation is invalidated or suspended. For reporting, for example, a method of displaying a text at the lower end of television screen or performing a display on a display unit of the remote controller is used.

Next, by using a flowchart in operation execution decision shown in FIG. 13, the operation execution decision process will be described. The following is directed to a process flow when the operation is suspended. For a process flow in the case of invalidation of operation, "invalidation" may substitutes for "suspension".

In step s1301, a remote control operation event is awaited and when such a remote control event as disturbing viewing, for example, channel switchover or recording reservation is detected, the program proceeds to step s1302.

In step s1302, interval watching concentration degree rate information is acquired from the watching concentration degree storage memory 144 of watching concentration degree calculation unit 140. Then, the program proceeds to step s1303.

In step s1303, when the interval watching concentration degree rate for all of the viewers are smaller than a threshold, the program proceeds to step s1309. In the other case, the program proceeds to step s1304.

In step s1304, by using a video image photographed by the image pickup unit 110, a remote controller position is detected with the remote controller position detector 151. Subsequently, the program proceeds to step s1305.

In step s1305, the operation decider 152 decides an operator on the basis of the remote controller position obtained in step s1304 and face positions of the televiewers.

In step s1306, if it is determined by using the interval watching concentration degree rate information obtained in step s1302 that the interval watching concentration degree rate is larger than the threshold by a value even for only one viewer other than the operator, the program proceeds to step s1307. In the other case, the program proceeds to step s1309.

In step s1307, the operation decision result is set to "suspension" and the control unit 170 is requested to issue a remote controller operation "suspension", followed by proceeding to step s1308.

In step s1308, a message to the effect that the operation is set to "suspension" is displayed in the form of letters, for example, at the lower end of the screen and reported to the operator.

In step s1309, the operation decision result indicates "execution" and the remote control operation remains valid.

Whether the operation is to be "invalidated" or "suspended" may be set in advance by the user but controllably, when an viewer joining the audience immediately precedently (for example, an viewer who has joined the audience during measurement of the interval watching concentration degree rate) operates, "invalidation" may be determined but when a televiewer who has attended to viewing for a somewhat long time operates, "suspension" may be determined.

A process during operation suspension will now be described by using a flowchart of a process during operation suspension shown in FIG. 14.

In step s1401, if operation is not suspended, the process ends. When operation is suspended, the program proceeds to step s1402.

In step s1402, synchronously with update of the interval watching concentration degree rate information, interval watching concentration degree rate information is acquired from the watching concentration degree storage memory 144. Then, the program proceeds to step s1403.

In step s1403, it is decided whether the interval watching concentration degree rate for audiences excepting an operator is larger than a threshold. If it is determined that interval watching concentration degree rate is larger than the threshold by a value even for only one viewer, the program proceeds to step s1404. In the other case, the program proceeds to step s1406.

In step s1404, it is decided whether the suspension continuation time is longer than a threshold. If shorter, the suspension continues. The program proceeds to step s1405. If longer, the program proceeds to step s1406.

In step s1405, the operation decision result remains to be "suspension" and the pending state continues.

In step s1406, the operation decision result is set to "suspension release" and the control unit 170 is requested to issue remote controller operation suspension release and the process ends.

As described so far, the pending state is looked at again in a unit of update of interval watching concentration degree rate during operation suspension and therefore, at the time that the watching concentration degree rate for TV viewers other than the operator lowers, the operation kept in suspension can be released to execution.

According to the foregoing embodiment of the invention, operation is suspended until the watching concentration degrees of audiences other than the operator decrease to a predetermined value. Accordingly, a television receiver can be provided which can permit a TV viewer to concentrate on a program without disturbance and to enjoy viewing the program.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A broadcasting receiver provided with an image pickup unit for forming a video image of one or more televiewers, comprising:
   a face detector configured to acquire image information of a face region inclusive of a face of each televiewer from the video image formed by said image pickup unit and generate face detection information for detecting the face by using the image information of the face region;
   an individual discrimination unit configured to discriminate the one or more televiewers in the video image from each other on the basis of the face detection information;
   an operator specifying unit configured to specify an operator, who provides an instruction to the broadcasting receiver, from the one or more televiewers discriminated by the individual discrimination unit; and
   an operation execution decision unit configured to determine invalidity of the instruction in accordance with viewing conditions of at least one televiewer other than the operator specified by the operator specifying unit.

2. The broadcasting receiver according to claim 1 further comprising a communication unit configured to inform the one or more televiewers of a decision result by said operation execution decision unit.

3. The broadcasting receiver according to claim 1, further comprising a watching concentration degree calculator configured to obtain a watching concentration degree indicating a degree of watching concentration of each televiewer, wherein
said individual discrimination unit includes a template generator for generating, from the face region image, personal template information corresponding to each televiewer;
said watching concentration degree calculator includes a face front detector for detecting a direction in which the face of each viewer faces by using the face region image; and
said template generator generates personal template information by using face region image information, based on which it is determined the face of each televiewer faces the broadcasting receiver by said face front detector.

4. The broadcasting receiver according to claim 1, further comprising a watching concentration degree calculator configured to obtain a watching concentration degree indicating a degree of watching concentration of each televiewers, wherein:
said watching concentration degree calculator is configured to:
calculate instantaneous watching concentration degree information obtained at predetermined time intervals;
hold interval watching concentration degree string information including pieces of instantaneous watching concentration degree information calculated at the predetermined time intervals starting from an arbitrary time; and
calculate interval watching concentration degree rate information on the basis of the interval watching concentration degree string information, and
said operation execution decision unit decides execution of the instruction by using said interval watching concentration degree rate information.

5. The broadcasting receiver according to claim 1, further comprising a watching concentration degree calculator configured to obtain a watching concentration degree indicating a degree of watching concentration of each televiewer, wherein
said watching concentration degree calculator includes a face front detector for detecting a direction in which the face of each televiewer faces by using said face region image and determines that the instantaneous watching concentration degree information obtained when the face of each televiewer faces said broadcasting receiver shows a concentrated watching state.

6. The broadcasting receiver according to claim 1, wherein the viewing condition includes a condition in which the at least one televiewer other than the operator is present and a condition in which no televiewer other than the operator is present.

7. The broadcasting receiver according to claim 6, wherein said operation execution decision unit invalidates the instruction when the at least one televiewer other than the operator is present.

8. The broadcasting receiver according to claim 6, wherein said operation execution decision unit is further configured to suspend the execution of the instruction while the at least one televiewer other than the operator is present.

9. The broadcasting receiver according to claim 8, wherein said operation execution decision unit does not suspend the execution of the instruction when the state in which no televiewer other than the operator is resent continues for a predetermined time after the execution was suspended.

10. The broadcasting receiver according to claim 2, wherein the viewing condition includes a condition in which the at least one televiewer other than the operator is present and a condition in which no televiewer other than the operator is present.

11. The broadcasting receiver according to claim 10, wherein said operation execution decision unit invalidates the instruction when a televiewer other than the operator is present.

12. The broadcasting receiver according to claim 10, wherein said operation execution decision unit suspends the execution of the instruction while the at least one televiewer other than the operator is present.

13. The broadcasting receiver according to claim 12, wherein said operation execution decision unit does not suspend the execution of the instruction when the state in which no televiewer other than the operator is present continues for a predetermined time after the execution was suspended.

14. The broadcasting receiver according to claim 2, wherein when a decision result by said operation execution decision unit includes invalidation or suspension of the execution of the instruction, a report is issued to let the one or more viewers know whether the execution of the instruction is invalidated or suspended.

15. The broadcasting receiver according to claim 2, further comprising a watching concentration degree calculator configured to obtain a watching concentration degree indicating a degree of watching concentration of each televiewer, wherein
said individual discrimination unit includes a template generator for generating, from the face region image, personal template information corresponding to each televiewer;
said watching concentration degree calculator includes a face front detector for detecting a direction in which the face of each viewer faces by using the face region image; and
said template generator generates personal template information by using face region image information, based on which it is determined the face of each viewer faces the broadcasting receiver by said face front detector.

16. The broadcasting receiver according to claim 2, further comprising a watching concentration degree calculator configured to obtain a watching concentration degree indicating a degree of watching concentration of each televiewers, wherein:
said watching concentration degree calculator is configured to:
calculate instantaneous watching concentration degree information obtained at predetermined time intervals;
hold interval watching concentration degree string information including pieces of instantaneous watching concentration degree information calculated at the predetermined time intervals starting from an arbitrary time; and
calculate interval watching concentration degree rate information on the basis of the interval watching concentration degree string information, and
said operation execution decision unit decides execution of the instruction by using said interval watching concentration degree rate information.

17. The broadcasting receiver according to claim 2, further comprising a watching concentration degree calculator configured to obtain a watching concentration degree indicating a degree of watching concentration of each televiewer, wherein said watching concentration degree calculator includes a face front detector for detecting a direction of the face of each televiewer by using said face region image and determines that the instantaneous watching concentration degree information obtained when the face of each televiewer faces said broadcasting receiver shows a concentrated watching state.

\* \* \* \* \*